US012700343B2

(12) United States Patent
Park et al.

(10) Patent No.: US 12,700,343 B2
(45) Date of Patent: Aug. 4, 2026

(54) POWER SUPPLY CIRCUIT AND DISPLAY DEVICE INCLUDING THE SAME

(71) Applicant: LG Display Co., Ltd., Seoul (KR)

(72) Inventors: Tae Hwa Park, Paju-si (KR); Hoon Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/940,272

(22) Filed: Nov. 7, 2024

(65) Prior Publication Data

US 2025/0174179 A1 May 29, 2025

(30) Foreign Application Priority Data

Nov. 29, 2023 (KR) ........................ 10-2023-0169310

(51) Int. Cl.
*G09G 3/32* (2016.01)
*H02M 3/157* (2006.01)
*H02M 3/158* (2006.01)

(52) U.S. Cl.
CPC ............. *G09G 3/32* (2013.01); *H02M 3/157* (2013.01); *H02M 3/158* (2013.01); *G09G 2330/021* (2013.01)

(58) Field of Classification Search
CPC .......... G09G 3/3208; G09G 2330/021; H02M 1/143; H02M 3/157; H02M 3/158
See application file for complete search history.

(56) References Cited

U.S. PATENT DOCUMENTS

2021/0225242 A1* 7/2021 Lee ........................... G09G 3/20

FOREIGN PATENT DOCUMENTS

KR        100819509 B1      4/2008
KR        102152631 B1      9/2020
KR        20220165115 A     12/2022
KR        102536673 B1      5/2023

* cited by examiner

*Primary Examiner* — Nathan P Brittingham

(74) *Attorney, Agent, or Firm* — Seed Intellectual Property Law Group LLP

(57) ABSTRACT

A display apparatus includes a display panel configured to display an image, a driver configured to drive the display panel, and a power supply including an output circuit configured to charge or discharge power input through an input terminal thereof to output through an output terminal thereof and an output controller configured to control charging or discharging of the output circuit, for supplying power to the display panel, wherein the output controller operates in one of a first driving mode of operating with a first switching frequency and a second driving mode of operating with a second switching frequency which is higher than the first switching frequency.

16 Claims, 7 Drawing Sheets

POWER SUPPLY CIRCUIT AND DISPLAY DEVICE INCLUDING THE SAME

CROSS-REFERENCE TO RELATED APPLICATIONS

This application claims the benefit of the Korean Patent Application No. 10-2023-0169310 filed on Nov. 29, 2023, which is hereby incorporated by reference as if fully set forth herein.

BACKGROUND

Technical Field

The present disclosure relates to a power supply and a display including the same.

Description of the Related Art

As information technology advances, the market for display apparatuses which are connection mediums connecting a user with information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied to the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

BRIEF SUMMARY

The present disclosure may provide an adaptive switching frequency control method which may set the prevention of wavy noise (ripple prevention), caused by an external change, to a higher-priority driving mode and may set the optimization of output efficiency to a lower-priority driving mode to optimize a switching frequency. Also, the present disclosure may control a switching frequency in real time, based on the prevention of wavy noise and an output efficiency factor of a display apparatus.

To achieve these technical features and other technical improvements and in accordance with the embodiments of the disclosure, as embodied and broadly described herein, a display apparatus includes a display panel configured to display an image, a driver configured to drive the display panel, and a power supply including an output circuit configured to charge or discharge power input through an input terminal thereof to output through an output terminal thereof and an output controller configured to control charging or discharging of the output circuit, for supplying power to the display panel, wherein the output controller operates in one of a first driving mode of operating with a first switching frequency and a second driving mode of operating with a second switching frequency which is higher than the first switching frequency.

The output controller may set the second driving mode to a higher-priority driving mode.

The output controller may include a signal generator configured to generate a switch signal for controlling an on/off switching timing of each of switches included in the output circuit, an efficiency calculator configured to calculate an efficiency calculation result value, based on an input current value flowing through the input terminal of the output circuit and an output current value flowing through the output terminal of the output circuit, a mode controller configured to generate a mode control value, based on the efficiency calculation result value provided from the efficiency calculator and a mode setting result value provided based on a mode setting value set by an external input and a peak-to-peak voltage value provided in the output terminal of the output circuit, and a signal controller configured to generate a signal for controlling the signal generator, based on a sensing value obtained by sensing a voltage output through the output terminal of the output circuit, an inductor current value output through an inductor of the output circuit, and the mode control value output from the mode controller.

The efficiency calculator may include a divider configured to perform a division operation so that the input current value and the output current value are selectively charged in a first capacitor and a second capacitor and are stored as efficiency values and a first comparator configured to compare the efficiency values charged in the first capacitor and the second capacitor to generate the efficiency calculation result value.

The mode controller may include a second comparator configured to compare the peak-to-peak voltage value with the mode setting value to generate the mode setting result value, an inverter configured to invert and output the mode setting result value output from the second comparator, and an AND gate configured to perform an AND operation on the mode setting result value inverted and output by the inverter and the efficiency calculation result value output from the efficiency calculator to generate an operation result value.

The signal controller may include a first resistor and a second resistor serially connected between the output terminal of the output circuit and a ground terminal, a third comparator configured to compare a reference voltage, obtained through a reference voltage terminal, with the sensing value obtained through a node between the first resistor and the second resistor to generate a first comparison result value, a fourth comparator configured to compare the inductor current value with the first comparison result value output from the third comparator to generate a second comparison result value, an oscillator configured to operate to generate a pulse value, based on the mode setting result value output from the second comparator of the mode controller and the operation result value output from the AND gate of the mode controller, and a fifth comparator configured to compare the second comparison result value, output from the fourth comparator, with the pulse value output from the oscillator to generate a control signal for controlling the signal generator.

In another aspect of the present disclosure, a power supply includes an output circuit configured to charge or discharge power input through an input terminal thereof to output through an output terminal thereof and an output controller configured to control charging or discharging of the output circuit, wherein the output controller operates in one of a first driving mode of operating with a first switching frequency and a second driving mode of operating with a second switching frequency which is higher than the first switching frequency.

The output controller may set the second driving mode to a higher-priority driving mode.

The output controller may include a signal generator configured to generate a switch signal for controlling an on/off switching timing of each of switches included in the output circuit, an efficiency calculator configured to calculate an efficiency calculation result value, based on an input current value flowing through the input terminal of the output circuit and an output current value flowing through the output terminal of the output circuit, a mode controller configured to generate a mode control value, based on the efficiency calculation result value provided from the efficiency calculator and a mode setting result value provided based on a mode setting value set by an external input and a peak-to-peak voltage value provided in the output terminal of the output circuit, and a signal controller configured to generate a signal for controlling the signal generator, based on a sensing value obtained by sensing a voltage output through the output terminal of the output circuit, an inductor current value output through an inductor of the output circuit, and the mode control value output from the mode controller.

The efficiency calculator may include a divider configured to perform a division operation so that the input current value and the output current value are selectively charged in a first capacitor and a second capacitor and are stored as efficiency values and a first comparator configured to compare the efficiency values charged in the first capacitor and the second capacitor to generate the efficiency calculation result value.

The mode controller may include a second comparator configured to compare the peak-to-peak voltage value with the mode setting value to generate the mode setting result value, an inverter configured to invert and output the mode setting result value output from the second comparator, and an AND gate configured to perform an AND operation on the mode setting result value inverted and output by the inverter and the efficiency calculation result value output from the efficiency calculator to generate an operation result value.

The signal controller may include a first resistor and a second resistor serially connected between the output terminal of the output circuit and a ground terminal, a third comparator configured to compare a reference voltage, obtained through a reference voltage terminal, with the sensing value obtained through a node between the first resistor and the second resistor to generate a first comparison result value, a fourth comparator configured to compare the inductor current value with the first comparison result value output from the third comparator to generate a second comparison result value, an oscillator configured to operate to generate a pulse value, based on the mode setting result value output from the second comparator of the mode controller and the operation result value output from the AND gate of the mode controller, and a fifth comparator configured to compare the second comparison result value, output from the fourth comparator, with the pulse value output from the oscillator to generate a control signal for controlling the signal generator.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, for convenience of description, a light emitting display apparatus self-emitting light by using an inorganic light emitting diode or an organic light emitting diode will be described for example.

Figure 1:
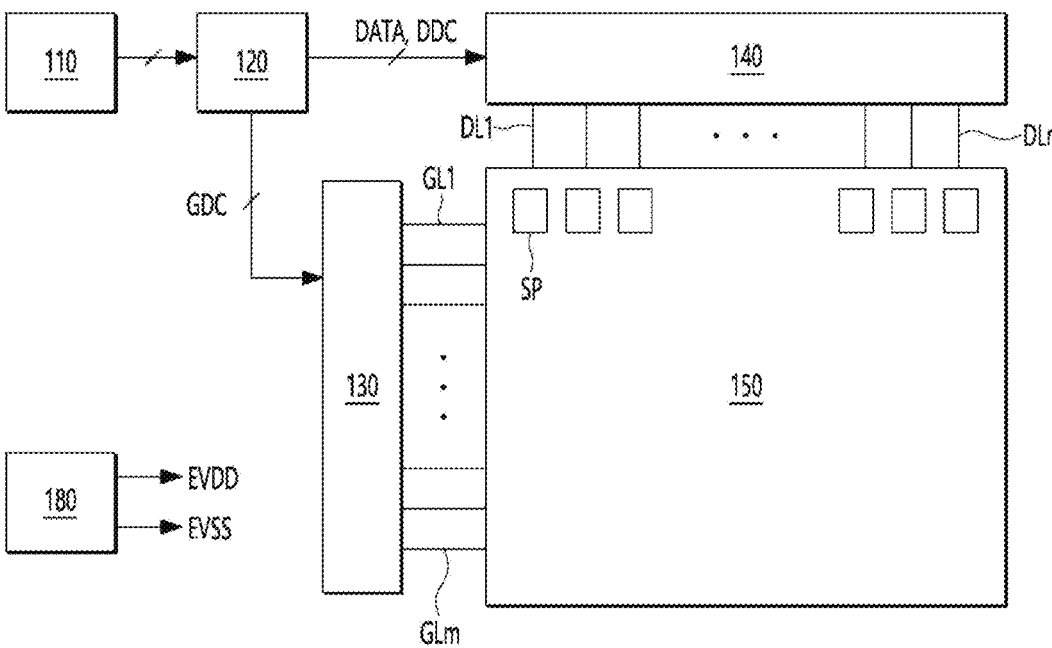
FIG. 1 is a block diagram schematically illustrating a light emitting display apparatus.
Figure 2:
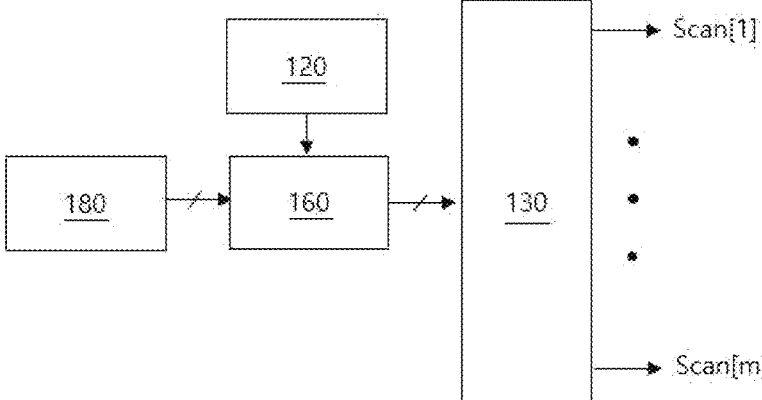
FIGS. 2 and 3 are diagrams for describing a configuration of a scan driver of a gate in panel (GIP) type.
Figure 3:
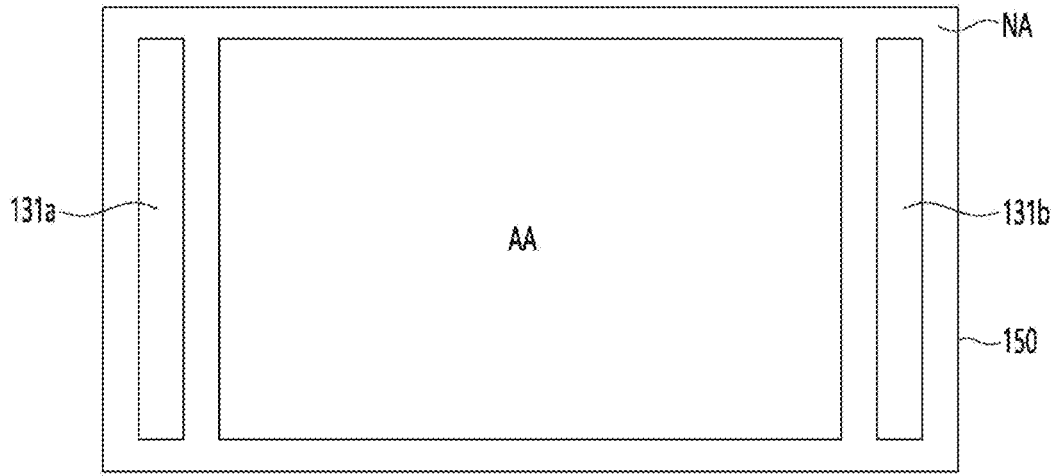
Figure 4:
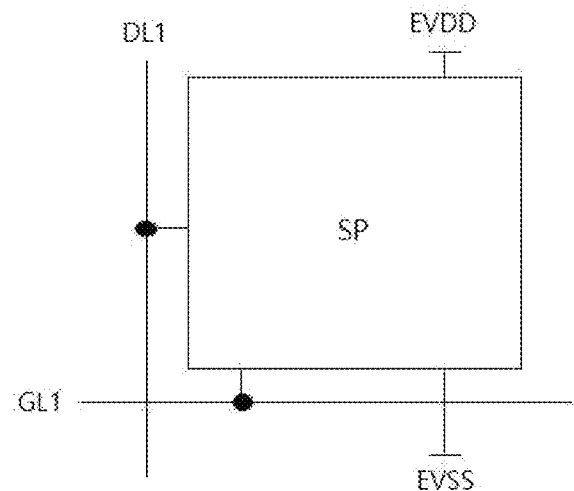
FIG. 4 is an exemplary diagram of a subpixel.

FIG. 1 is a block diagram schematically illustrating a light emitting display apparatus, FIGS. 2 and 3 are diagrams for describing a configuration of a scan driver of a gate in panel (GIP) type, and FIG. 4 is an exemplary diagram of a subpixel.

As illustrated in FIGS. 1 to 4, a light emitting display apparatus according to an embodiment of the present disclosure may include a video supply unit 110, a timing controller 120, a scan driver 130, a data driver 140, a display panel 150, and a power supply 180.

The video supply unit 110 (a set or a host system) may output a video data signal supplied from the outside or various driving signals and an image data signal stored in an internal memory thereof. The video supply unit 110 may supply a data signal and the various driving signals to the timing controller 120.

The timing controller 120 may output a gate timing control signal GDC for controlling an operation timing of the scan driver 130, a data timing control signal DDC for controlling an operation timing of the data driver 140, and various synchronization signals (a vertical synchronization signal Vsync and a horizontal synchronization signal Hsync). The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The scan driver 130 may output a scan signal (or a scan voltage) in response to the gate timing control signal GDC supplied from the timing controller 120. The scan driver 130 may supply the scan signal to a plurality of subpixels, included in the display panel 150, through a plurality of gate lines GL1 to GLm. The scan driver 130 may be implemented as an IC type or may be directly provided on the display panel 150 in a GIP type, but is not limited thereto. Herein-after, however, for convenience of description, a GIP-type scan driver as in FIGS. 2 and 3 will be described for example.

As illustrated in FIGS. 2 and 3, a GIP-type scan driver 130 may include shift registers 130a and 130b which are formed as a GIP type at one side and the other side of a non-display area NA of the display panel 150. The shift registers 130a and 130b may be formed as a thin film type in the non-display area NA of the display panel 150, based on the GIP type. The GIP-type scan driver 130 may output scan signals Scan[1] to Scan[m] for turning on or off transistors provided in a display area AA of the display panel 150.

The GIP-type scan driver 130 may operate based on voltages and signals output from the timing controller 120, the power supply 180, and the level shifter 160. The level shifter 160 may generate signals needed for driving of the GIP-type scan driver 130 (130a and 130b), based on volt-ages and signals output from the timing controller 120 and the power supply 180.

In response to the data timing control signal DDC sup-plied from the timing controller 120, the data driver 140 may sample and latch the data signal DATA, convert a digital data signal into an analog data voltage, based on a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate an output voltage including a high-level voltage and a low-level voltage, based on an input voltage supplied from the outside, and may output the high-level voltage and the low-level voltage through a high-level voltage line EVDD and a low-level voltage line EVSS each connected to the display panel 150. The power supply 180 may generate and output a voltage (for example, a gate high voltage and a gate low voltage) needed for driving of the scan driver 130 or a voltage (for example, a drain voltage and a half drain voltage) needed for driving of the data driver 140, in addition to the high-level voltage and the low-level voltage.

The display panel 150 may be manufactured based on a substrate, having stiffness or flexibility, such as glass, sili-con, or polyimide. The display panel 150 may include a plurality of subpixels SP for displaying an image, based on the high-level voltage, the low-level voltage, and a driving signal including the scan signal and a data voltage. As illustrated in FIG. 4, the subpixel SP may be connected to a first data line DL1, a first gate line GL1, the high-level voltage line EVDD, and the low-level voltage line EVSS.

The subpixel SP may self-emit light. The subpixel SP may emit light having one color of red, green, blue, and white.

Hereinabove, each of the timing controller 120, the scan driver 130, and the data driver 140 has been described as an individual element. However, based on an implementation type of the light emitting display apparatus, one or more of the timing controller 120, the scan driver 130, and the data driver 140 may be integrated into one IC.

Figure 5:
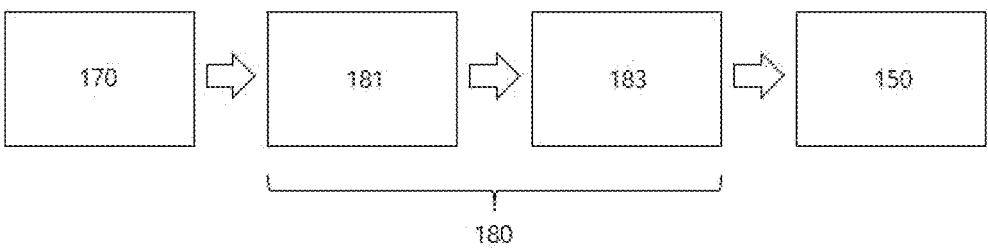
FIG. 5 is a block diagram for describing a configuration associated with a power generating operation of a power supply according to a first embodiment.
Figure 6:
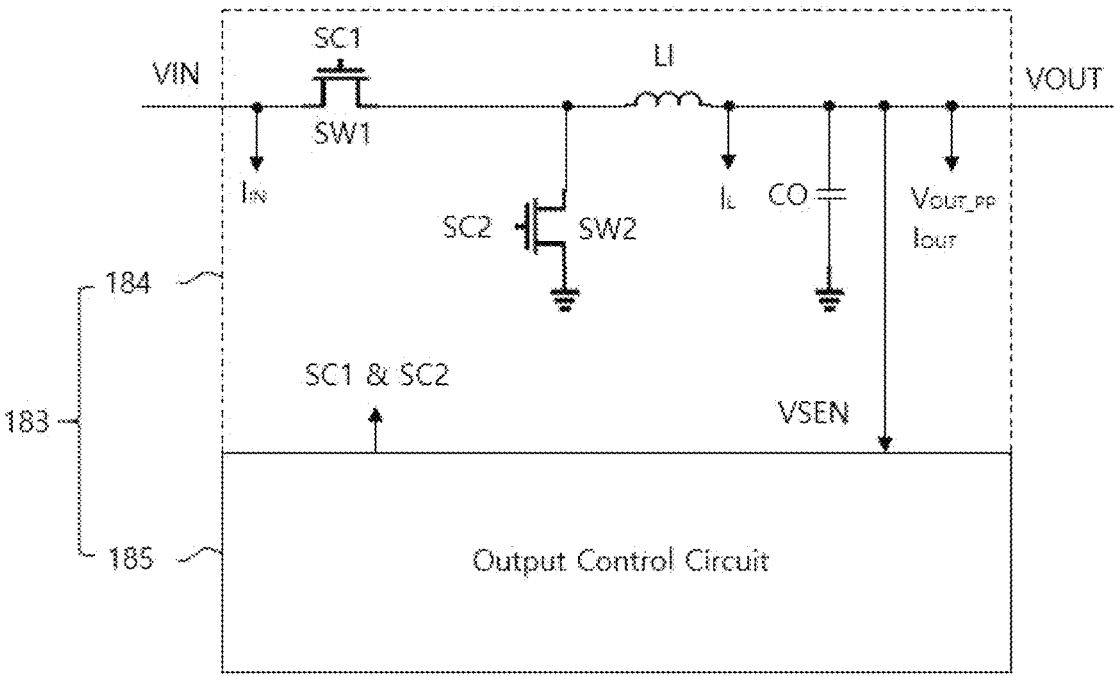
FIG. 6 is a block diagram schematically illustrating some elements included in the power supply according to the first embodiment.
Figure 7:
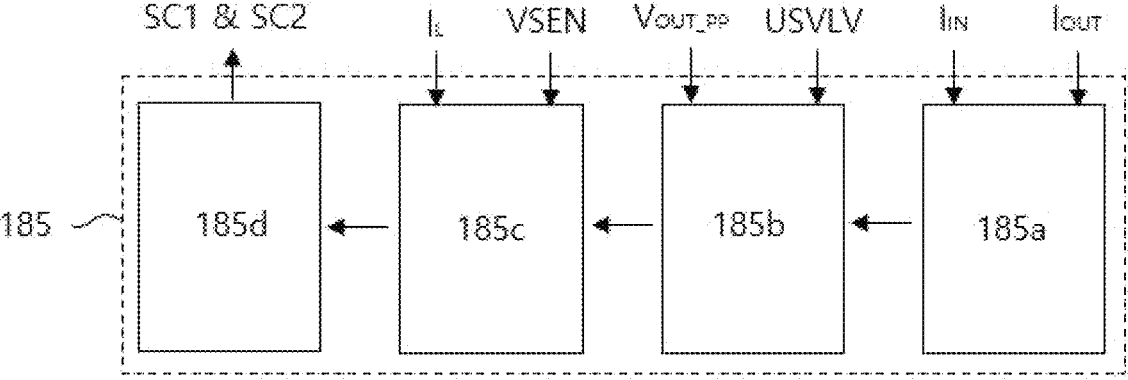
FIG. 7 is a block diagram illustrating an output controller illustrated in FIG. 6.

FIG. 5 is a block diagram for describing a configuration associated with a power generating operation of a power supply 180 according to a first embodiment, FIG. 6 is a block diagram schematically illustrating some elements included in the power supply 180 according to the first embodiment, and FIG. 7 is a block diagram illustrating an output controller illustrated in FIG. 6.

As illustrated in FIG. 5, the power supply 180 may include a first power supply unit 181 and a second power supply unit 183 so as to generate an output power which is to be supplied to a display panel 150, based on an external power source 170. For example, when the display panel 150 is a small and medium model, the external power source 170 may be selected as a battery of 12 V, but is not limited thereto.

The first power supply unit 181 may be selected as a pre-boost circuit which boosts an input power supplied from the external power source 170 to generate an output power. The second power supply unit 183 may be selected as a buck converter circuit which generates an output power for driv-ing the display panel 150, based on the output power generated by the first power supply unit 181. For example, the first power supply unit 181 may boost 12 V to output 15 V, and the second power supply unit 183 may decrease 15 V to output 12.5 V, but the present embodiment is not limited thereto.

Furthermore, in the present disclosure, the first power supply unit 181 and the second power supply unit 183 may be individually described as separate elements, but this may be merely an embodiment for providing convenience of description and helping understanding. Also, the first power supply unit 181 may be omitted based on an external power source or device.

As illustrated in FIG. 6, the second power supply unit 183 according to the first embodiment may include an output circuit unit 184 and an output controller 185, so as to decrease power input through an input terminal VIN to output through an output terminal VOUT.

The output circuit unit 184 may charge or discharge power input through the input terminal VIN and may pro-vide power which is to be output through the output terminal VOUT. The output controller 185 may be charged or dis-charged with power input through the input terminal VIN and may control the output circuit unit 184 to efficiently generate a desired power.

The output circuit unit 184 may include a first switch SW1, a second switch SW2, an inductor LI, and an output capacitor CO. The first switch SW1 may include a first electrode connected to the input terminal VIN, a second electrode connected to a first electrode of the second switch SW2 and a first electrode of the inductor LI, and a gate electrode connected to a first switch control line SC1. The second switch SW2 may include a first electrode connected to the second electrode of the first switch SW1 and the first electrode of the inductor LI, a second electrode connected to a ground terminal, and a gate electrode connected to a second switch control line SC2. The inductor LI may include the first electrode connected to the first electrode of the second switch SW2 and the second electrode of the first switch SW1 and a second electrode connected to the output terminal VOU. The output capacitor CO may include a first electrode connected to the output terminal VOU and a second electrode connected to the ground terminal.

The output controller 185 may control an on/off switching timing of each of the first switch SW1 and the second switch SW2, based on a current and a voltage formed at the input terminal VIN and the output terminal VOUT of the output circuit unit 184. The output controller 185 may generate a first switch signal and a second switch signal for controlling the on/off switching timing of each of the first switch SW1 and the second switch SW2. The first switch signal and the second switch signal output from the output controller 185 may be output through the first switch control line SC1 and the second switch control line SC2.

As illustrated in FIGS. 6 and 7, the output controller 185 may be an element for generating the first switch signal and the second switch signal and may include an efficiency calculator 185a, a mode controller 185b, a signal controller 185c, and a signal generator 185d.

The efficiency calculator 185a may calculate optimal output efficiency, based on an input current value $I_{IN}$ flowing through the input terminal VIN of the output circuit unit 184 and an output current value $I_{OUT}$ flowing through the output terminal VOUT of the output circuit unit 184.

The efficiency calculator 185a may calculate optimal output efficiency, based on an input/output current ratio occurring when a load of the output terminal VOUT of the output circuit unit 184 is changed under the same input/output condition of the output circuit unit 184. The efficiency calculator 185a may generate an efficiency calculation result value for determining rising or falling of a frequency may be generated.

The mode controller 185b may control the signal controller 185c, based on a mode setting value USVLV and a peak-to-peak voltage value $V_{OUT\_PP}$ provided (or occurring) in the output terminal VOUT of the output circuit unit 184.

The mode controller 185b may generate a mode control value, based on an efficiency calculation result value provided from the efficiency calculator 185a and a mode setting result value provided based on the mode setting value USVLV and the peak-to-peak voltage value $V_{OUT\_PP}$.

Furthermore, the mode setting value USVLV may be provided based on the peak-to-peak voltage value $V_{OUT\_PP}$ provided (or occurring) in the output terminal VOUT of the output circuit unit 184. For example, the mode setting value USVLV may be a peak-to-peak limit voltage value (Vpp Limit Value) or a value before a ripple of the output terminal of the power supply 180 occurs and may be defined through an experiment. The mode setting value USVLV may include one of a passive setting value input from the outside to a device by a user and an automatic setting value input from an external device such as a timing controller.

The signal controller 185c may generate a control signal for controlling the signal generator 185d, based on a sensing value VSEN obtained by sensing a voltage output through the output terminal VOUT of the output circuit unit 184, an inductor current value $I_L$ output through the inductor LI of the output circuit unit 184, and a mode control value output from the mode controller 185b.

The signal generator 185d may generate the first switch signal and the second switch signal for controlling the on/off switching timing of each of the first switch SW1 and the second switch SW2 of the output circuit unit 184, based on a signal output from the signal controller 185c. The signal generator 185d may generate the first switch signal and the second switch signal and may vary a switching frequency thereof, based on a pulse width modulation (PWM) scheme.

Based on the elements described above, the power supply 180 according to the first embodiment may fast or slowly vary a switching frequency. In driving the power supply 180, a speed of the switching frequency may have a trade-off relationship. For example, when the switching frequency is fast, output efficiency may be reduced, and ripple may be reduced. On the other hand, when the switching frequency is slow, output efficiency may be enhanced, and ripple may increase.

The power supply 180 according to the first embodiment may operate to generate an output power, based on a switching frequency where efficiency is increased based on an input/output current ratio. Also, when wavy noise occurs, the power supply 180 according to the first embodiment may operate to generate an output power, based on a switching frequency where efficiency is increased within a range where wavy noise does not occur. Wavy noise may be defined as a factor which adversely affects the display quality and driving reliability of a display panel when the ripple of the output terminal of the power supply 180 occurs or increases.

Figure 8:
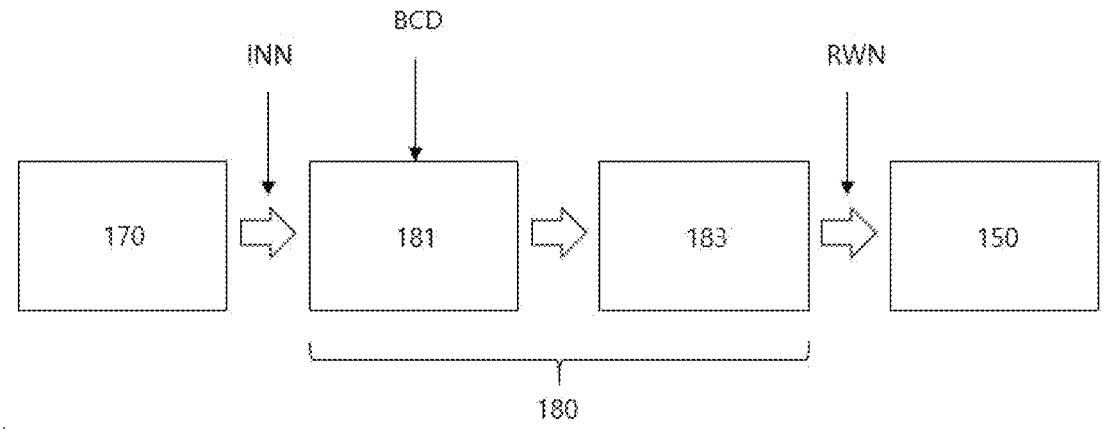
FIGS. 8 and 9 are diagrams for describing advantages of the power supply according to the first embodiment.
Figure 9:
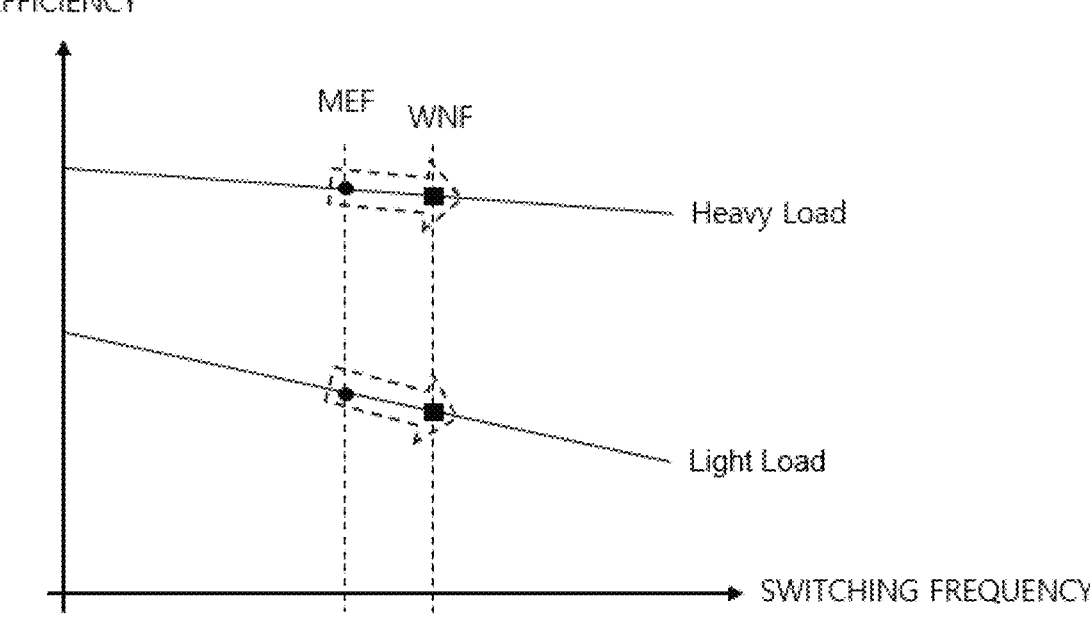

FIGS. 8 and 9 are diagrams for describing advantages of the power supply 180 according to the first embodiment.

As illustrated in FIGS. 8 and 9, the power supply 180 according to the first embodiment may control a switching frequency, based on output efficiency and noise. As a result, the power supply 180 may maintain a robust output even when there are input noise INN occurring (penetration) in the input terminal, a booster characteristic degradation BCD occurring in the first power supply unit 181, and wavy noise RWN caused by an increase in ripple occurring in the output terminal of the second power supply unit 183. This will be described below.

When a relatively light load is in the display panel 150, the power supply 180 according to the first embodiment may operate to realize relatively low output efficiency. Also, when a relatively heavy load is in the display panel 150, the power supply 180 according to the first embodiment may operate to realize relatively high output efficiency. A point where optimal output efficiency is implemented for each load of a power supply may be changed based on an input/output condition and an external influence (noise, etc.). Accordingly, a point for implementing increased output efficiency may be automatically detected based on various conditions, thereby increasing an advantage.

The power supply 180 according to the first embodiment may consider output efficiency and noise together, and thus, may automatically compare output efficiency for each load to operate in a high-efficiency driving mode MEF (for example, a first driving mode) or a noise reduction mode WNF (for example, a second driving mode).

In the high-efficiency driving mode MEF, the power supply 180 may operate with a switching frequency (a relatively slow switching frequency) for implementing increased output efficiency, based on a characteristic of the display panel 150. In the noise reduction mode WNF, the power supply 180 may operate with a switching frequency (a relatively fast switching frequency) for reducing ripple, based on the occurrence of wavy noise.

Furthermore, when wavy noise occurs, the power supply 180 according to the first embodiment may select the noise reduction mode WNF for preventing wavy noise instead of the high-efficiency driving mode MEF for implementing increased output efficiency to operate.

Figure 10:
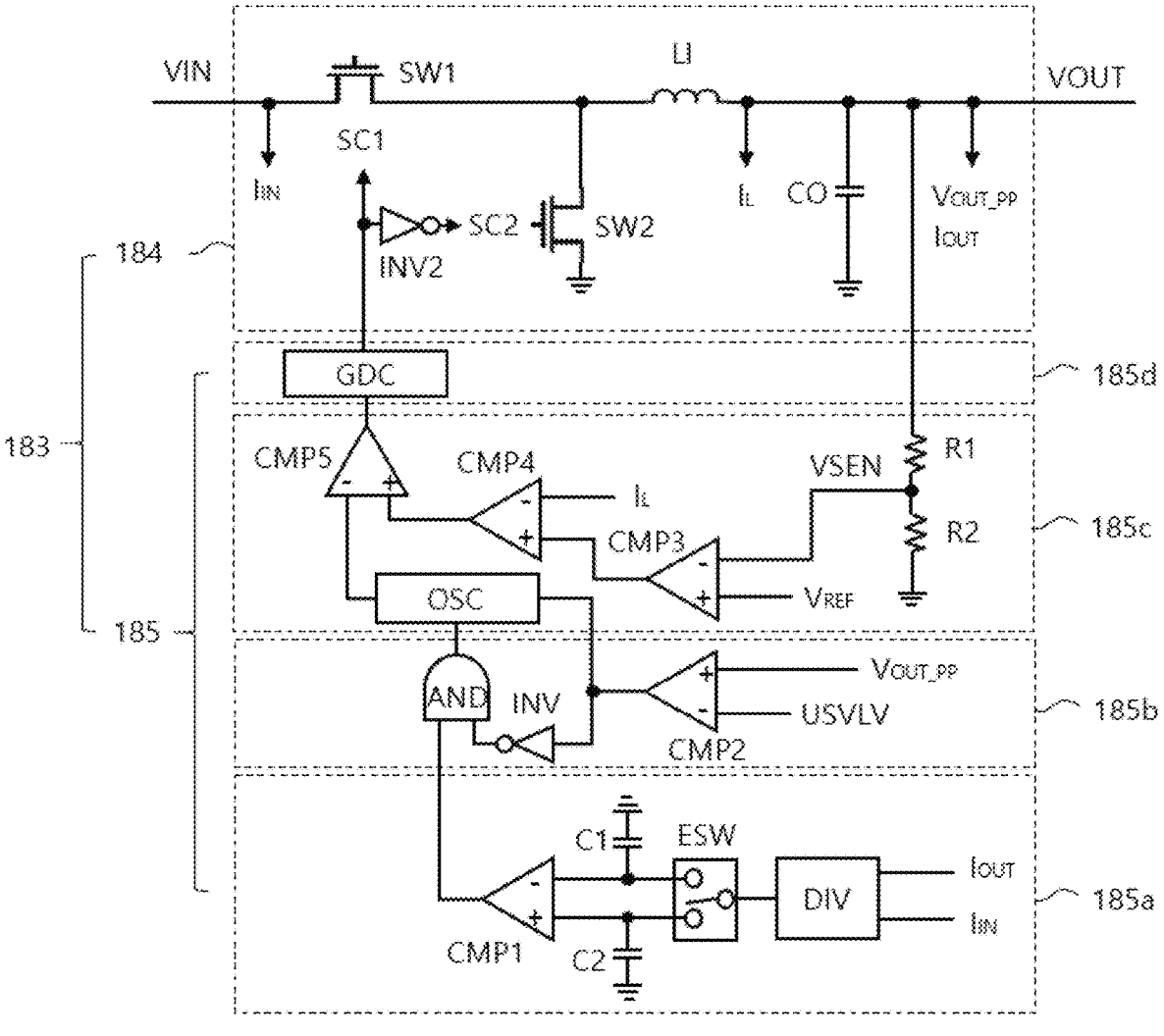
FIG. 10 is a circuit diagram illustrating in more detail some elements included in a power supply according to a second embodiment.
Figure 11:
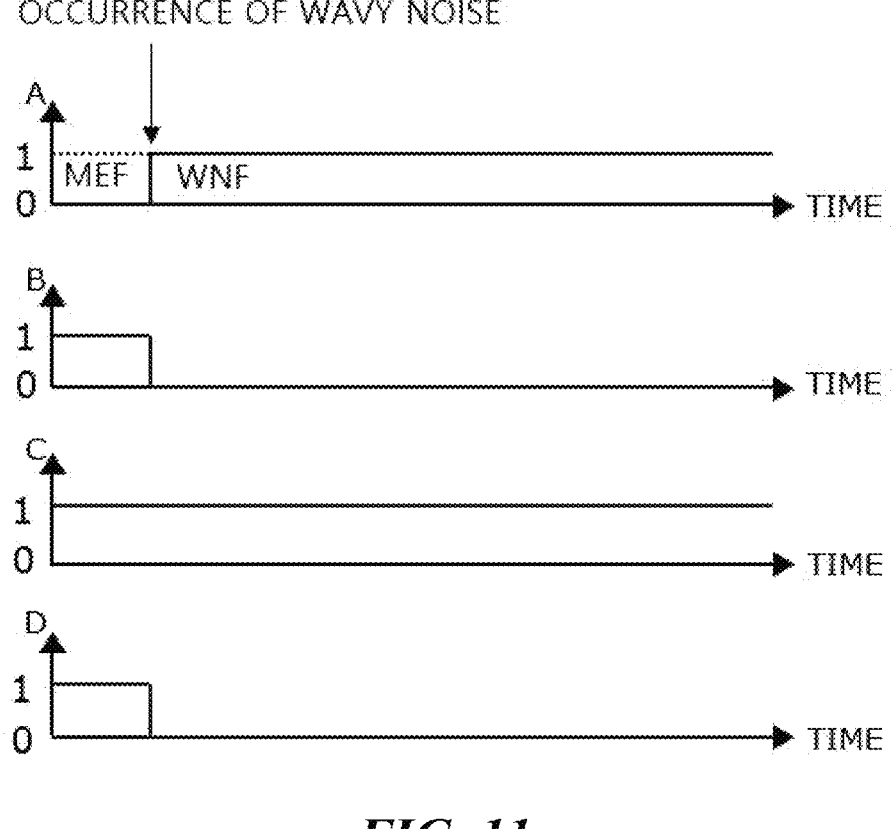
FIG. 11 is a waveform diagram for describing a driving method of a second power supply unit according to the second embodiment.
Figure 12:
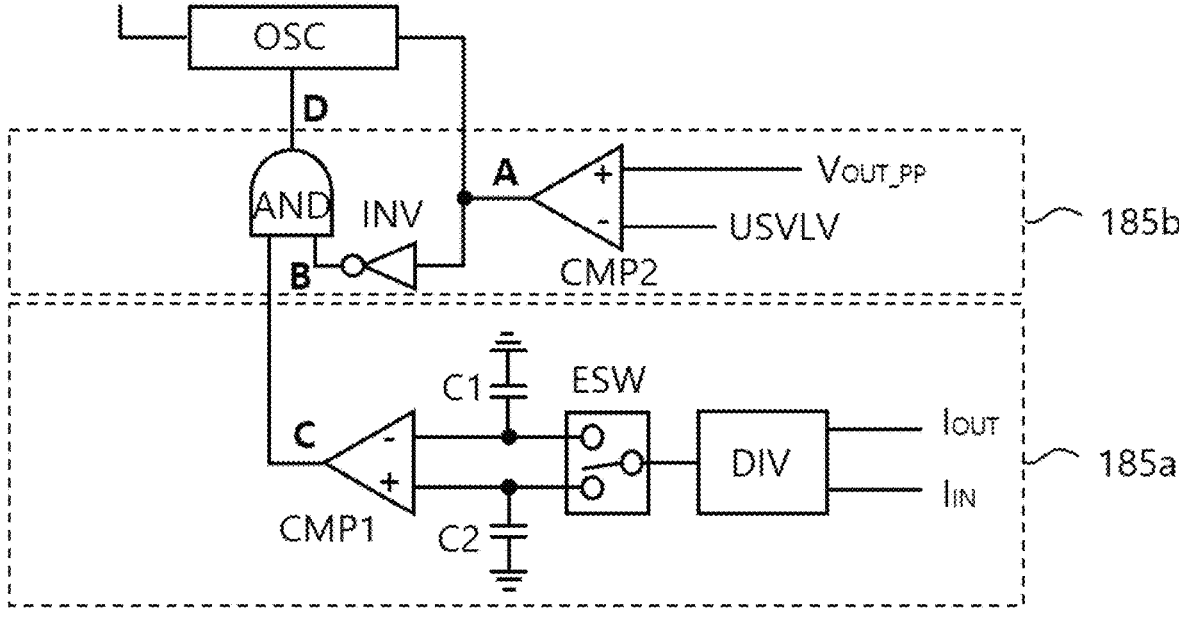
FIG. 12 is a diagram for describing an output state of each of some elements included in the second power supply unit according to the second embodiment.

FIG. 10 is a circuit diagram illustrating in more detail some elements included in a power supply 180 according to a second embodiment, FIG. 11 is a waveform diagram for describing a driving method of a second power supply unit 183 according to the second embodiment, and FIG. 12 is a diagram for describing an output state of each of some elements included in the second power supply unit 183 according to the second embodiment.

As illustrated in FIG. 10, the second power supply unit 183 according to the second embodiment may include an output circuit unit 184 and an output controller 185, so as to decrease power input through an input terminal VIN to output through an output terminal VOUT.

The output circuit unit 184 may charge or discharge power input through the input terminal VIN and may provide power which is to be output through the output terminal VOUT. The output controller 185 may be charged or discharged with power input through the input terminal VIN and may control the output circuit unit 184 to efficiently generate a desired power.

The output circuit unit 184 may include a first switch SW1, a second switch SW2, an inductor LI, and an output capacitor CO. A connection relationship between the first switch SW1, the second switch SW2, the inductor LI, and the output capacitor CO included in the output circuit unit 184 may refer to the first embodiment.

The output controller 185 may control an on/off switching timing of each of the first switch SW1 and the second switch SW2, based on a current and a voltage formed at the input terminal VIN and the output terminal VOUT of the output circuit unit 184. The output controller 185 may generate a first switch signal and a second switch signal for controlling the on/off switching timing of each of the first switch SW1 and the second switch SW2.

The first switch signal and the second switch signal output from the output controller 185 may be output through the first switch control line SC1 and the second switch control line SC2. A charging operation may be performed based on the turn-on of the first switch SW1, and a discharging operation may be performed based on the turn-on of the second switch SW2. Power input through the input terminal VIN of the output circuit unit 184 may be reduced by a charging/discharging operation of each of the first switch SW1 and the second switch SW2.

The output controller 185 may be an element for generating the first switch signal and the second switch signal and may include an efficiency calculator 185a, a mode controller 185b, a signal controller 185c, and a signal generator 185d.

The efficiency calculator 185a may calculate optimal output efficiency, based on an input current value $I_{IN}$ flowing through the input terminal VIN of the output circuit unit 184 and an output current value $I_{OUT}$ flowing through the output terminal VOUT of the output circuit unit 184.

The efficiency calculator 185a may calculate optimal output efficiency, based on an input/output current ratio occurring when a load of the output terminal VOUT of the output circuit unit 184 is changed under the same input/output condition of the output circuit unit 184, and may generate an efficiency calculation result value for determining rising or falling of a frequency.

The efficiency calculator 185a may be an element for calculating optimal output efficiency, based on the input/output current ratio, and may include a divider DIV, a selector ESW, a first capacitor C1, a second capacitor C2, and a first comparator CMPL.

The divider DIV may perform a division operation of dividing the input current value $I_{IN}$ and the output current value $I_{OUT}$ to distribute to the selector ESW. The selector ESW may perform a selection operation so that the input current value $I_{IN}$ and the output current value $I_{OUT}$ are distributed and output from the divider DIV and are selectively charged in the first capacitor C1 and the second capacitor C2.

The first comparator CMP1 may compare an efficiency value, charged in the first capacitor C1 connected to an inverting terminal (−) thereof, with an efficiency value charged in the second capacitor C2 connected to a noninverting terminal (+) thereof to generate an efficiency calculation result value of 0 or 1, so as to calculate optimal output efficiency.

For example, the first comparator CMP1 may store a before-frequency-variation efficiency value in the second capacitor C2, may store an after-frequency-variation efficiency value in the first capacitor C1, and may generate a better efficiency value as an efficiency calculation result value through the comparison of the two values. In this case, when the before-frequency-variation efficiency value stored in the second capacitor C2 is greater than the after-frequency-variation efficiency value stored in the first capacitor C1, a result value of 1 may be generated. On the other hand, when the after-frequency-variation efficiency value stored in the first capacitor C1 is greater than the before-frequency-variation efficiency value stored in the second capacitor C2, a result value of 0 may be generated.

The mode controller 185b may control the signal controller 185c, based on a mode setting value USVLV and a peak-to-peak voltage value $V_{OUT\_PP}$ provided (or occurring) in the output terminal VOUT of the output circuit unit 184.

The mode controller 185b may generate a mode control value, based on an efficiency calculation result value provided from the efficiency calculator 185a and a mode setting result value provided based on the mode setting value USVLV and the peak-to-peak voltage value $V_{OUT\_PP}$. Meanwhile, the mode setting value USVLV may include one of a passive setting value input from the outside to a device by a user and an automatic setting value input from an external device such as a timing controller.

The mode controller 185b may be an element for controlling the signal controller 185c, based on the mode setting value USVLV and the peak-to-peak voltage value $V_{OUT\_PP}$, and may include a second comparator CMP2, an inverter INV, and an AND gate AND.

The second comparator CMP2 may compare the peak-to-peak voltage value $V_{OUT\_PP}$, input through a noninverting terminal (+) thereof, with the mode setting value USVLV input through an inverting terminal (−) thereof to generate a mode setting result value of 0 or 1. The mode setting result value generated by the second comparator CMP2 may be transferred to an input terminal of the inverter INV and a first input terminal of an oscillator OSC included in the signal controller 185c.

The inverter INV may invert the mode setting result value generated by the second comparator CMP2 to transfer to the AND gate AND. The AND gate AND may perform an AND operation on the mode setting result value output from the inverter INV and the efficiency calculation result value output from the efficiency calculator 185a to generate an operation result value. The operation result value output from the AND gate AND may be transferred to a second input terminal of the oscillator OSC included in the signal controller 185c.

The signal controller 185c may generate a control signal for controlling the signal generator 185d, based on a sensing value VSEN obtained by sensing a voltage output through the output terminal VOUT of the output circuit unit 184, an inductor current value $I_L$ output through the inductor LI of the output circuit unit 184, and a mode control value output from the mode controller 185*b*.

The signal controller 185*c* may be an element which generates a signal for controlling the signal generator 185*d* and may include a first resistor R1, a second resistor R2, a third comparator CMP3, a fourth comparator CMP4, a fifth comparator CMP5, and the oscillator OSC.

The first resistor R1 and the second resistor R2 may be serially connected between the output terminal VOUT of the output circuit unit 184 and a ground terminal, so as to sense a voltage output through the output terminal VOUT of the output circuit unit 184.

The third comparator CMP3 may compare a reference voltage, obtained through a noninverting terminal (+) connected to a reference voltage terminal VREF, with a sensing value VSEN obtained through an inverting terminal (−) thereof connected to a node between the first resistor R1 and the second resistor R2 to generate a first comparison result value.

The fourth comparator CMP4 may compare an inductor current value $I_L$, obtained through an inverting terminal (−) thereof, with the first comparison result value of the third comparator CMP3 obtained through a noninverting terminal (+) thereof to generate a second comparison result value. That is, the signal controller 185*c* may have a condition which it is possible to generate a signal for controlling the signal generator 185*d*, based on a current generated from the inductor LI and a voltage output through the output terminal VOUT.

The oscillator OSC may operate to generate a pulse value (for example, a PWM pulse), based on the mode setting result value output from the second comparator CMP2 of the mode controller 185*b* and the operation result value output from the AND gate AND of the mode controller 185*b*.

The fifth comparator CMP5 may compare the pulse value of the oscillator OSC, obtained through an inverting terminal (−) thereof, with the second comparison result value of the fourth comparator CMP4 obtained through a noninverting terminal (+) thereof to generate a signal for controlling the signal generator 185*d*.

The signal generator 185*d* may generate a first switch signal and a second switch signal for controlling an on/off switching timing of each of the first switch SW1 and the second switch SW2 of the output circuit unit 184, based on a signal output from the signal controller 185*c*. The signal generator 185*d* may generate the first switch signal and the second switch signal and may vary a switching frequency thereof, based on a PWM scheme.

Furthermore, in FIG. 10, an example is illustrated where a switch signal generator GDC and an inverter INV2 are included in the signal generator 185*d*, a first switch signal output from the switch signal generator GDC is inverted into a second switch signal by using the inverter INV2. However, this may be merely an embodiment for helping understanding, and the present disclosure is not limited thereto.

As illustrated in FIGS. 10 to 12, the second power supply unit 183 according to the second embodiment may consider output efficiency and noise together, and thus, may automatically compare output efficiency for each load to operate in a high-efficiency driving mode MEF or a noise reduction mode WNF, based on whether wavy noise occurs. Hereinafter, for convenience of description, a case where the efficiency calculator 185*a* outputs 1 may be assumed, and a mode-based operation based on whether wavy noise occurs will be described.

When wavy noise does not occur, the power supply 180 may operate in the high-efficiency driving mode MEF. For example, when the mode setting value USVLV is greater than the peak-to-peak voltage value $V_{OUT\_PP}$, the second comparator CMP2 of the mode controller 185*b* may output 0 as a mode setting result value A. When 0 is output as the mode setting result value, the oscillator OSC of the signal controller 185*c* may lower a switching frequency.

The inverter INV of the mode controller 185*b* may invert the mode setting result value generated by the second comparator CMP2 to output 1 as an output value B. The efficiency calculator 185*a* may perform an operation of obtaining optimal output efficiency to output 1 as an output value C. Accordingly, when an operation of obtaining the optimal output efficiency is not performed, the efficiency calculator 185*a* may output 0 as an output value C.

The AND gate AND may perform an AND operation on a value input through two input terminals to output 1 as an output value D. As described above, when wavy noise does not occur, the power supply 180 may operate a switching frequency (a relatively slow switching frequency) enabling increased output efficiency, based on a characteristic of the display panel 150.

When wavy noise occurs, the power supply 180 may operate in the noise reduction mode WNF. For example, when the peak-to-peak voltage value $V_{OUT\_PP}$ is greater than the mode setting value USVLV, the second comparator CMP2 of the mode controller 185*b* may output 1 as the mode setting result value A. When 1 is output as the mode setting result value A, the oscillator OSC of the signal controller 185*c* may increase the switching frequency.

The inverter INV of the mode controller 185*b* may invert the mode setting result value generated by the second comparator CMP2 to output 0 as the output value B. The first comparator CMP1 of the efficiency calculator 185*a* may output 1 as the output value C for performing an operation of obtaining optimal output efficiency. The AND gate AND may perform an AND operation on a value input through two input terminals to output 0 as the output value D.

As described above, when 1 is output as the mode setting result value A of the mode controller 185*b* and 0 is output as the output value D for obtaining optimal output efficiency, this may correspond to a case where wavy noise occurs, and thus, the power supply 180 may operate in the noise reduction mode WNF. When wavy noise occurs, the power supply 180 may operate a switching frequency (a relatively fast switching frequency) for decreasing ripple, based on the occurrence of wavy noise.

Furthermore, when 0 is output as the mode setting result value A of the mode controller 185*b*, this may correspond to the high-efficiency driving mode MEF, and thus, a switching frequency may not be changed and may be maintained as a previous switching frequency, regardless of a result value which is output as the output value D for obtaining optimal output efficiency.

Hereinabove, the present disclosure may provide a power supply based on an adaptive switching frequency control method, which may set the prevention of wavy noise (ripple prevention), caused by an external change, to a higher-priority driving mode and may set the optimization of output efficiency to a lower-priority driving mode to optimize a switching frequency, and a display apparatus including the power supply. Also, the present disclosure may provide a power supply and a display apparatus including the same, which may control a switching frequency in real time, based on the prevention of wavy noise and an output efficiency factor of a display apparatus.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure and the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus comprising:
a display panel configured to display an image;
a driver configured to drive the display panel; and
a power supply circuit for supplying power to the display panel, the power supply circuit including an output circuit and an output controller, the output circuit configured to charge or discharge a power input through an input terminal thereof and to output an power output through an output terminal thereof, and the output controller configured to control charging or discharging of the output circuit,
wherein the output controller is configured to operate in one of a first driving mode of operating with a first switching frequency or a second driving mode of operating with a second switching frequency that is higher than the first switching frequency based on at least one of a current value or a voltage value of the power output through the output terminal of the output circuit, and
wherein the output controller includes:
a signal generator configured to generate a switch signal for controlling an on/off switching timing of each of switches included in the output circuit;
an efficiency calculator configured to calculate an efficiency calculation result value, based on an input current value flowing through the input terminal of the output circuit and an output current value flowing through the output terminal of the output circuit;
a mode controller configured to generate a mode control value, based on the efficiency calculation result value provided from the efficiency calculator and a mode setting result value provided based on a mode setting value set by an external input and a peak-to-peak voltage value provided in the output terminal of the output circuit; and
a signal controller configured to generate a signal for controlling the signal generator, based on a sensing value obtained by sensing a voltage output through the output terminal of the output circuit, an inductor current value output through an inductor of the output circuit, and the mode control value output from the mode controller.

2. The display apparatus of claim 1, wherein the output controller sets the second driving mode to a higher-priority driving mode.

3. The display apparatus of claim 1, wherein the driving mode of the output controller is determined according to output efficiency of the output circuit and noise.

4. The display apparatus of claim 1, wherein the efficiency calculator comprises:
a divider configured to perform a division operation so that the input current value and the output current value are selectively charged in a first capacitor and a second capacitor and are stored as efficiency values; and
a first comparator configured to compare the efficiency values charged in the first capacitor and the second capacitor to generate the efficiency calculation result value.

5. The display apparatus of claim 4, wherein the mode controller comprises:
a second comparator configured to compare the peak-to-peak voltage value with the mode setting value to generate the mode setting result value;
an inverter configured to invert and output the mode setting result value output from the second comparator; and
an AND gate configured to perform an AND operation on the mode setting result value inverted and output by the inverter and the efficiency calculation result value output from the efficiency calculator to generate an operation result value.

6. The display apparatus of claim 5, wherein the signal controller comprises:
a first resistor and a second resistor serially connected between the output terminal of the output circuit and a ground terminal;
a third comparator configured to compare a reference voltage, obtained through a reference voltage terminal, with the sensing value obtained through a node between the first resistor and the second resistor to generate a first comparison result value;
a fourth comparator configured to compare the inductor current value with the first comparison result value output from the third comparator to generate a second comparison result value;
an oscillator configured to operate to generate a pulse value, based on the mode setting result value output from the second comparator of the mode controller and the operation result value output from the AND gate of the mode controller; and
a fifth comparator configured to compare the second comparison result value, output from the fourth comparator, with the pulse value output from the oscillator to generate a control signal for controlling the signal generator.

7. A power supply circuit comprising:
an output circuit configured to charge or discharge power input through an input terminal thereof and to output a power output through an output terminal thereof; and
an output controller configured to control charging or discharging of the output circuit,
wherein the output controller operates in one of a first driving mode of operating with a first switching frequency or a second driving mode of operating with a second switching frequency that is higher than the first switching frequency based on a current value or a voltage value of the power output through the output terminal of the output circuit, and
wherein the output controller comprises:

a signal generator configured to generate a switch signal for controlling an on/off switching timing of each of switches included in the output circuit;

an efficiency calculator configured to calculate an efficiency calculation result value, based on an input current value flowing through the input terminal of the output circuit and an output current value flowing through the output terminal of the output circuit;

a mode controller configured to generate a mode control value, based on the efficiency calculation result value provided from the efficiency calculator and a mode setting result value provided based on a mode setting value set by an external input and a peak-to-peak voltage value provided in the output terminal of the output circuit; and a signal controller configured to generate a signal for controlling the signal generator, based on a sensing value obtained by sensing a voltage output through the output terminal of the output circuit, an inductor current value output through an inductor of the output circuit, and the mode control value output from the mode controller.

8. The power supply of claim 7, wherein the output controller sets the second driving mode to a higher-priority driving mode.

9. The power supply of claim 7, wherein the driving mode of the output controller is determined according to output efficiency of the output circuit and noise.

10. The power supply of claim 7, wherein the efficiency calculator comprises:

a divider configured to perform a division operation so that the input current value and the output current value are selectively charged in a first capacitor and a second capacitor and are stored as efficiency values; and a first comparator configured to compare the efficiency values charged in the first capacitor and the second capacitor to generate the efficiency calculation result value.

11. The power supply of claim 10, wherein the mode controller comprises:

a second comparator configured to compare the peak-to-peak voltage value with the mode setting value to generate the mode setting result value;

an inverter configured to invert and output the mode setting result value output from the second comparator; and an AND gate configured to perform an AND operation on the mode setting result value inverted and output by the inverter and the efficiency calculation result value output from the efficiency calculator to generate an operation result value.

12. The power supply of claim 11, wherein the signal controller comprises:

a first resistor and a second resistor serially connected between the output terminal of the output circuit and a ground terminal;

a third comparator configured to compare a reference voltage, obtained through a reference voltage terminal, with the sensing value obtained through a node between the first resistor and the second resistor to generate a first comparison result value;

a fourth comparator configured to compare the inductor current value with the first comparison result value output from the third comparator to generate a second comparison result value;

an oscillator configured to operate to generate a pulse value, based on the mode setting result value output from the second comparator of the mode controller and the operation result value output from the AND gate of the mode controller; and a fifth comparator configured to compare the second comparison result value, output from the fourth comparator, with the pulse value output from the oscillator to generate a control signal for controlling the signal generator.

13. A display apparatus comprising:

a display panel configured to display an image;

a driver configured to drive the display panel; and a power supply circuit for supplying power to the display panel, the power supply circuit including an output circuit and an output controller, the output circuit configured to charge or discharge a power input through an input terminal thereof and to output an power output through an output terminal thereof, and the output controller configured to control charging or discharging of the output circuit, wherein the output controller is configured to operate in one of a first driving mode of operating with a first switching frequency or a second driving mode of operating with a second switching frequency that is higher than the first switching frequency, wherein the output controller includes:

a signal generator configured to generate a switch signal for controlling an on/off switching timing of each of switches included in the output circuit;

an efficiency calculator configured to calculate an efficiency calculation result value, based on an input current value flowing through the input terminal of the output circuit and an output current value flowing through the output terminal of the output circuit;

a mode controller configured to generate a mode control value, based on the efficiency calculation result value provided from the efficiency calculator and a mode setting result value provided based on a mode setting value set by an external input and a peak-to-peak voltage value provided in the output terminal of the output circuit; and a signal controller configured to generate a signal for controlling the signal generator, based on a sensing value obtained by sensing a voltage output through the output terminal of the output circuit, an inductor current value output through an inductor of the output circuit, and the mode control value output from the mode controller.

14. The display apparatus of claim 13, wherein the efficiency calculator comprises:

a divider configured to perform a division operation so that the input current value and the output current value are selectively charged in a first capacitor and a second capacitor and are stored as efficiency values; and a first comparator configured to compare the efficiency values charged in the first capacitor and the second capacitor to generate the efficiency calculation result value.

15. The display apparatus of claim 14, wherein the mode controller comprises:

a second comparator configured to compare the peak-to-peak voltage value with the mode setting value to generate the mode setting result value;

an inverter configured to invert and output the mode setting result value output from the second comparator; and an AND gate configured to perform an AND operation on the mode setting result value inverted and output by the inverter and the efficiency calculation result value output from the efficiency calculator to generate an operation result value.

16. The display apparatus of claim 15, wherein the signal controller comprises:

a first resistor and a second resistor serially connected between the output terminal of the output circuit and a ground terminal;

a third comparator configured to compare a reference voltage, obtained through a reference voltage terminal, with the sensing value obtained through a node between the first resistor and the second resistor to generate a first comparison result value;

a fourth comparator configured to compare the inductor current value with the first comparison result value output from the third comparator to generate a second comparison result value;

an oscillator configured to operate to generate a pulse value, based on the mode setting result value output from the second comparator of the mode controller and the operation result value output from the AND gate of the mode controller; and a fifth comparator configured to compare the second comparison result value, output from the fourth comparator, with the pulse value output from the oscillator to generate a control signal for controlling the signal generator.

\* \* \* \* \*